Figure 1:
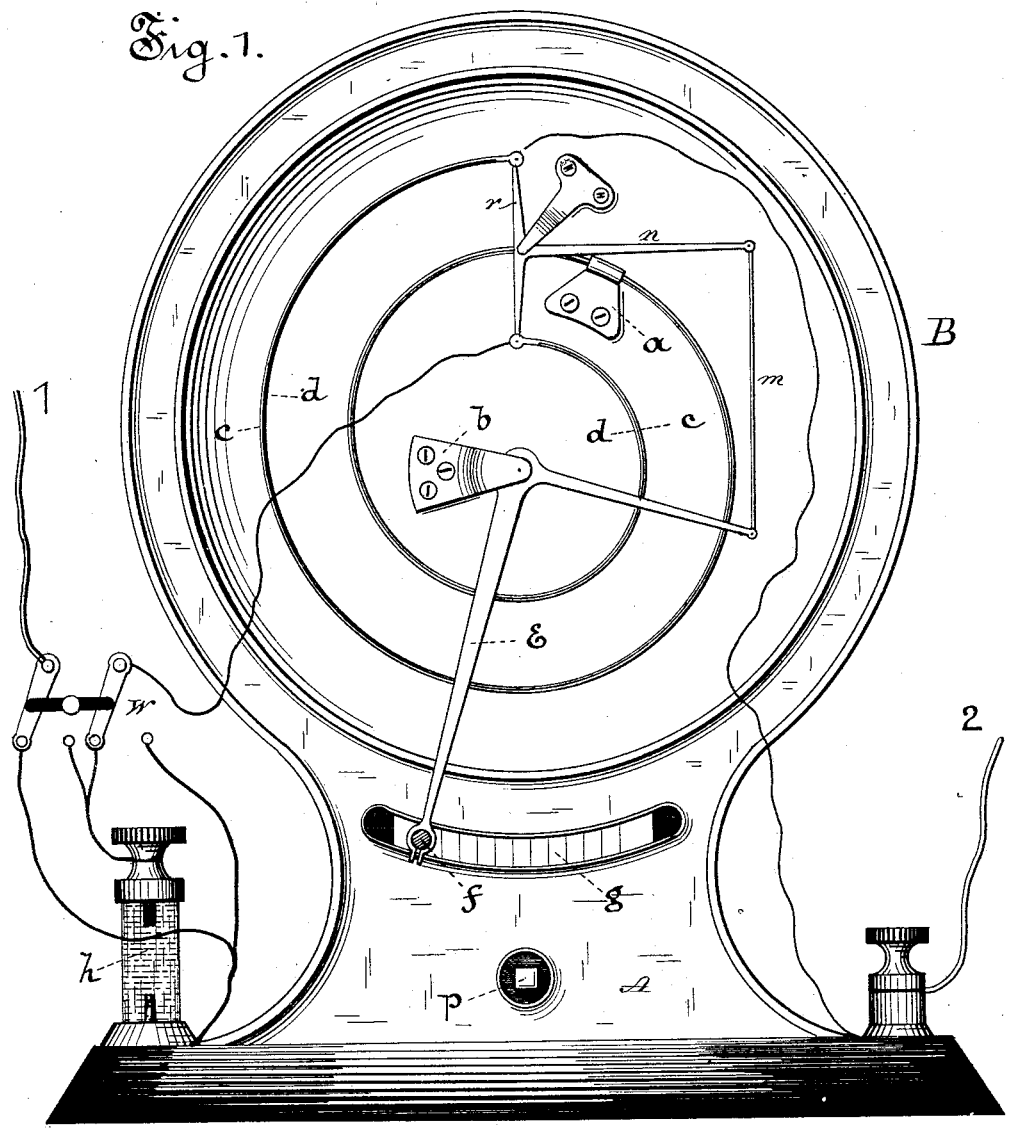

(No Model.)

S. D. MOTT.
ELECTRIC METER.

No. 336,133. Patented Feb. 16, 1886.

Attest:
H. W. Seely
Wm. Whitney Munroe.

Inventor:
S. D. Mott
by H. C. Townsend
Atty

N. PETERS, Photo-Lithographer, Washington, D. C.

UNITED STATES PATENT OFFICE.

SAMUEL D. MOTT, OF NEW YORK, N. Y., ASSIGNOR, BY DIRECT AND MESNE ASSIGNMENTS, TO THE SCHUYLER ELECTRIC LIGHT COMPANY OF NEW YORK.

ELECTRIC METER.

SPECIFICATION forming part of Letters Patent No. 336,133, dated February 16, 1886.

Application filed August 24, 1883. Serial No. 104,645. (No model.) Patented in England September 29, 1882, No. 4,645.

*To all whom it may concern:*

Be it known that I, SAMUEL D. MOTT, a citizen of the United States, and a resident of New York, in the county of New York and State of New York, have invented certain new and useful Improvements in Electric Meters, of which the following is a specification.

My invention relates to instruments for keeping an automatic registry or record of the flow of electric currents, and is more particularly designed for employment with electric-lighting systems.

The object of my invention is to obtain by simple means a correct record of the amount of current supplied to a lamp or number of lamps or passing over any conductor; and to this end my invention consists in the combination, with a moving recording-surface—such as a strip of paper or a revolving card—of a recording stylus or marker controlled in its position upon the recording-surface by the heating effects of the electric current.

My invention consists, further, in the combination, with a moving recording-surface, of a stylus or marker bearing on said surface, and a metallic thermometer actuating said stylus and heated by the passage of the electric current through or around it.

My invention consists, also, in the combination, with a recording-stylus actuated by a metallic thermometer which is heated by the passage of the electric current through a resistance, of a liquid conductor connected to or forming a portion of the circuit, for the purpose of compensating for the differences in the resistance caused by variations of atmospheric temperature.

In carrying out my invention I may utilize the heating effects of the current in any way by causing the current to pass through a resistance, and may cause the heat so evolved to affect to varying degrees a thermometer device for actuating to varying degrees the recording-stylus, so that the greater the current and the greater the consequent temperature the farther will the stylus be moved from its normal position or the position assumed when no current is passing. I prefer in most cases to combine the resistance and the thermometer in one by causing the current to pass through the metallic thermometer of any desired kind constructed to form an electric resistance. The metallic thermometer best suited for this purpose is the well-known form consisting of two dissimilar metals—such as iridium and platinum, which have different rates of expansion, but are neither of them readily fused by the electric current. The record made by the stylus will of course be made in accordance with the well-known law that the heating effects of electricity in passing through a resistance are as the square of the current, and the record as made by the stylus must of course be read, or the graduations upon the chart made, in accordance with that law; or, if desired, the instrument may be graduated empirically by passing currents of different known strengths through it and observing the record as made upon the moving record-surface.

I have specified iridium and platinum as the two metals making up the thermometric strip, but do not of course limit myself to such metals, nor to such a form of thermometer.

It is likewise within the spirit of my invention to apply the heating effects of the current to the thermometer specified, or to any other thermometer, in other ways than by passing the current through it—as, for instance, by placing the thermometer in close proximity to an electric resistance heated by the passage of the electric current to be recorded.

Figure 2:
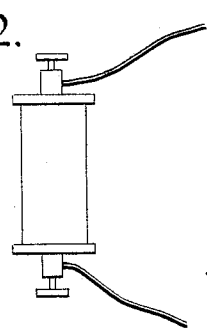

One of the various forms that my invention may assume in practice is shown in the accompanying drawings, in which Figure 1 is an elevation of the instrument with the front of its casing removed. Fig. 2 is a side view of the liquid compensating resistance.

A indicates the casing of the instrument, containing suitable clock-work or other mechanism, the winding-arbor of which is indicated at $p$, and by which mechanism movement is imparted to a recording sheet or disk, $g$, traveling beneath a marking pencil, pen, or stylus, $f$, which latter is attached to a swinging arm or elbow-lever, E, by which it is moved transversely to the direction of movement of the sheet $g$. Lever E is connected by a link, $m$, with an arm, $n$, extending from a lever, $r$, to the opposite ends of which latter are connected the ends of a spiral compound strip, c d, made of two metals—such as iridium and platinum or silver and platinum—which compound strip, when heated, will twist or straighten and impart movement to the stylus f, causing it to assume a position transversely of the recording-sheet determined by the degree of heat to which the strip is exposed. In the present instance the compound strip is included in a circuit, 1 2, as indicated, and is made of rather small diameter, so as to afford a resistance to any current on the circuit 1 2 which carries the whole or a portion of the current to be measured.

If the compound strip be made sufficiently stiff, it will not respond to variations of atmospheric temperature, and the record made will be a correct indication of the heating effects of the electric current in the strip. If, however, the strip be made of great delicacy, so as to feel changes of atmospheric temperature, the errors which might be then otherwise produced may be compensated for by the interposition or suitable connection of a compensating conductor, which shall by its variations of resistance, due to atmospheric causes, control the flow of current in the compound strip, so as to diminish the flow in such strip or the electric resistance when the atmospheric temperature rises, and to increase the flow when the atmospheric temperature falls.

The compensating conductor may be arranged either in direct or derived circuit with the electric resistance that heats the thermometer, but in the one case should be of a liquid and in the other of a metal. If of a metal and in a derived circuit, an increase of atmospheric temperature would cause it to divert more current into the branch containing the thermometric resistance to compensate for the increase of resistance in the latter. If the compensating conductor be a liquid, it would be placed in the direct circuit with the electrical resistance and with the thermometer, and its own resistance would diminish simultaneously with the increase in the thermometer resistance, in accordance with the law that the resistance of liquids decreases with an increase of temperature, while that of metals increases. Such a liquid resistance is indicated at h, included in the circuit 1 2, and provided with adjustable electrodes to vary the amount of resistance.

A current-reversing switch, W, serves to reverse the flow of the current in the liquid resistance, so as to compensate for any decomposition or electro-deposition that may have taken place by causing a recomposition.

Other forms may be given to the apparatus, and other kinds of actuating thermometric devices heated by the passage of an electric current through a resistance may be employed.

What I claim as my invention is—

1. The combination, for an electric meter, of a recording surface and stylus and a thermometric actuating device for said stylus, heated by the passage of the current to be measured through an electric resistance.

2. The combination, substantially as described, of a recording-stylus and an actuating metallic thermometer forming a portion of an electric circuit.

3. The combination, substantially as described, in an electric meter, of a recording-stylus and an actuator therefor consisting of a compound metallic strip heated by the passage of the current to be measured through an electric resistance.

4. The combination, for an electric meter, of a moving recording-surface, a stylus or marker, and a compound metallic strip connected to said marker and forming a portion of an electric circuit.

5. The combination of a compound metallic strip heated by the passage of an electric current, a recording-stylus, and a compensating conductor connected to the electric circuit for compensating for changes of atmospheric temperature, as and for the purpose described.

6. The combination, with a recording-stylus and thermometric actuating device therefor, of an electric resistance forming a portion of an electric circuit, the heating effects in which resistance serve to move the stylus, and a compensating conductor, whereby the effects of atmospheric changes in temperature upon the apparatus may be compensated by changing the flow of current in the resistance.

7. In an electric meter, a resistance heated by the passage of the currents to be measured, and registering or controlling devices controlled thereby, in combination with a compensating conductor, for the purpose described.

Signed at New York, in the county of New York and State of New York, this 21st day of June, A. D. 1883.

SAMUEL D. MOTT.

Witnesses:
THOS. TOOMEY,
M. M. FRIEND.